(12) United States Patent
Lohr

(10) Patent No.: US 6,497,521 B1
(45) Date of Patent: *Dec. 24, 2002

(54) NO-IMPACT KEYBOARD

(76) Inventor: Daniel James Lohr, PMB 293 1302 24th St. West, Billings, MT (US) 59102

( * ) Notice: Subject to any disclaimer, the term of this patent is extended or adjusted under 35 U.S.C. 154(b) by 0 days.

This patent is subject to a terminal disclaimer.

(21) Appl. No.: 09/465,720

(22) Filed: Dec. 17, 1999

(51) Int. Cl.$^7$ .................................................. B41J 5/12
(52) U.S. Cl. ...................... 400/491; 400/481; 400/491.3
(58) Field of Search ............... 400/491, 491.1, 400/493.1, 495.1, 495, 491.3, 491.2, 48, 472; 341/22, 21; 200/5 R, 5 A

(56) References Cited

U.S. PATENT DOCUMENTS

| | | | |
|---|---|---|---|
| 793,462 A | | 6/1905 | Munson |
| 3,641,286 A | * | 2/1972 | Berezowski ................. 200/5 A |
| 3,736,397 A | * | 5/1973 | Pedersen ............... 200/169 PB |
| 3,964,594 A | | 6/1976 | Gabbrielli et al. ............. 197/98 |
| 4,039,068 A | | 8/1977 | Giorza et al. .................. 197/98 |
| 4,311,990 A | * | 1/1982 | Burke ....................... 400/491.3 |
| 4,313,685 A | * | 2/1982 | Stahl et al. ................ 400/491.2 |
| 4,362,408 A | * | 12/1982 | Cordes et al. ............. 400/491.2 |
| 5,172,990 A | | 12/1992 | Weng ........................... 400/490 |
| 5,216,316 A | * | 6/1993 | Ipcinski ....................... 310/338 |
| 5,290,115 A | | 3/1994 | Little ........................... 400/491 |
| 5,459,461 A | * | 10/1995 | Crowley et al. .......... 400/491.1 |
| 5,494,363 A | | 2/1996 | Hochgesang ................. 400/495 |
| 5,508,479 A | | 4/1996 | Schooley ...................... 200/5 R |
| 5,525,979 A | | 6/1996 | Engle et al. ................... 341/32 |
| 5,595,449 A | | 1/1997 | Vitkin .......................... 400/472 |
| 5,612,520 A | * | 3/1997 | Toedtman et al. ......... 200/16 D |
| 5,612,692 A | | 3/1997 | Dugas et al. .................. 341/22 |
| 5,933,133 A | | 8/1999 | Lohr ............................ 345/168 |

OTHER PUBLICATIONS

Olson, Leaf Spring Module, IBM Technical Disclosure Bulletin, vol. 25, No. 4, pp. 1969 and 1970.*

* cited by examiner

*Primary Examiner*—Anthony H. Nguyen
(74) *Attorney, Agent, or Firm*—Steven W. Smith

(57) ABSTRACT

A no-impact keyboard for decreasing the risk of a repetitive stress injury to the user. The keyboard comprises a plurality of keys having a key cap and a stem, an impact absorbing mechanism which prevents any part of a key from striking a hard surface during a keystroke, and a sensor for sending an actuation signal from each key when the key passes a defined point in the keystroke. The impact absorbing mechanism may be a spring, a magnetic mechanism, or a hydraulic-pneumatic mechanism.

4 Claims, 8 Drawing Sheets

NO-IMPACT KEYBOARD

BACKGROUND OF THE INVENTION

1. Technical Field of the Invention

This invention relates to computer input devices, and more particularly, to a keyboard which produces little or no impact on a user's fingers, thereby decreasing the risk of a repetitive stress injury such as carpal tunnel syndrome.

2. Description of Related Art

Along with the rapid growth of machine automation and the widespread personal and professional use of computers, there has been an increase in repetitive stress injuries. Commonly occurring in the workplace, these injuries include upper limb disorders such as "Carpal Tunnel Syndrome", cumulative trauma disorder, and occupational overuse syndrome.

Frequent users of personal computers, such as shown in FIG. 1, are at risk for a repetitive stress injury when interacting with the device through a standard electronic keyboard. Stress injuries arise from accumulative strain on the limbs over a period of time. In contrast to using a traditional manual typewriter, the computer keyboard user no longer takes breaks from data input for carriage returns, error corrections, and paper insertions. Instead, the user achieves the equivalent of these functions with additional keystrokes, never removing the hands from the keyboard or repositioning the arms to reach for items such as correction fluid, paper, or an adding machine.

This uninterrupted use places a continuous strain on the fingers and upper limbs, especially due to the stress of the constant impact from the keyboard. When each key reaches the bottom of a keystroke, it "bottoms out," causing a small impact to the fingers as the key hits onto a hard plastic surface or non-resilient material. The vibration of impact travels up the hand and arm, stressing the soft tissues such as the muscles, tendons, and ligaments. This is similar to the vibration of impact traveling up the leg of a runner when his foot hits the ground, causing his muscles and joints to become sore. Typing on a keyboard without any cushion for the impact of the keys is similar to a person running without cushioning in his shoes, quickly leading to soreness and pain if done continuously, and contributing to the development of a repetitive stress injury.

For example, with reference to FIG. 1, a personal computer system typically includes a computer 12, a display device 14, a keyboard 15 and a mouse 16. The standard keyboard 16 includes an alphanumeric keypad 18, a row of function keys 20, a numeric keypad 22 and a command keypad 24. While seated at the computer system 10, facing the display 14, the user's upper torso, arms, wrists, and hands rarely change position while the user's fingers are operating the keyboard 15. This uninterrupted, repetitive impact of the fingers over a standard keyboard may cause excessive use and chronic fatigue of the muscles and tendons, causing the tendons to swell, and at the same time, squeezing the median nerve as it passes through the wrist ligament. This leads to pain and discomfort, and it is commonly associated with symptoms such as numbness, burning, and tingling sensations in the hands and arms. These symptoms are commonly associated with Carpal Tunnel Syndrome, a syndrome of median nerve compression with symptoms in the hands and arm where the nerve runs. Medical treatments for this condition include physical therapy and surgery to relieve the pressure on the median nerve.

FIGS. 2–4 illustrate the tissue and nerves affected by carpal tunnel syndrome, depicting the human wrist 30 in FIGS. 2 and 3, and the arm 40 in FIG. 4. With reference to FIGS. 2–4, carpal tunnel syndrome is caused by compression of the median nerve 31, which travels from the neck to the fingers, through the upper arm 22, forearm 24, wrist 25, and hand 28. The palmar carpal ligament 32, shown reflected in FIG. 2, wraps around the bones 27, 29, of the wrist 25, otherwise known as the carpals, to form the carpal tunnel 35. The muscles 23 of the forearm 24 are attached by the tendons 26 to the fingers and travel underneath the carpal ligament 32, as does the median nerve 31.

Carpal tunnel syndrome occurs when the tissues in the carpal tunnel 35 become irritated and as a result, swell and eventually compress the median nerve 31, causing the symptoms noted above. Traditional writings on carpal tunnel syndrome have identified the cause of the irritation and swelling variously as chronic fatigue of the muscles, overuse of the tendons, and rubbing of the tendons, muscles and bones due to repetitive use of the hands and fingers. In particular, holding the wrists in "unnatural" positions enhance the rubbing of tendons and contribute to muscle fatigue. For example, the position of the wrist while typing on a conventional, straight keyboard has been cited as a major contributor to carpal tunnel syndrome.

As a result of the above diagnosis of the cause of carpal tunnel syndrome, the prior art approaches to preventing these injuries include adjusting the work environment to better fit the user's body. These ergonomic adjustments include the use of wrist pads, split keyboards, keyboard replacements, and keyboards and drawers with wrist supports unitarily formed within. Devices such as the split keyboard create a "natural" position of the user's wrists while typing. These devices, however, have not significantly reduced the incidence of carpal tunnel syndrome.

The Applicant's research suggests that the traditional view of the cause of carpal tunnel syndrome is limited, and as a result, the prior art solutions to the problem have been largely ineffective. Carpal tunnel syndrome does not occur merely from repetitively using the fingers and hands. For thousands of years, people have worked at repetitive upper limb tasks which have not led to the large numbers of persons experiencing the symptoms described above. Even with the advent of the manual typewriter, there were not reported cases of symptoms similar to carpal tunnel syndrome.

Instead, the cause of the tissue irritation is from the loading placed on the muscles and tendons of the arm, and the repetitive impact stress caused by typing on keyboards on which the keys strike a hard surface at the bottom of the keystroke. The use of the non-giving design of a traditional keyboard is similar to repetitively striking the fingers against a hard desk top, or like a person running on hard concrete without cushioned shoes. The harder the fingers are struck, the more evident the "bone jarring" impact becomes. Each impact causes tension in the tendons to spike to high levels, and sets up a vibration which must be absorbed by the surrounding tissues. Although the impact of fingers on a keyboard may not appear injurious, research shows that the loading on the muscles is much higher than expected, and the repetitive impact and resultant vibrations from thousands of keystrokes that end on a hard solid surface causes the tissues in the carpal tunnel 35 to become irritated, and as a result, to swell and eventually compress the median nerve 31.

The prior art neither teaches nor suggests a means to lessen the strain placed on the upper limbs through repetitive absorption of vibrations from the impact of each keystroke. In order to decrease the risk of a repetitive stress injury, it would be advantageous to have a no-impact keyboard which reduces or eliminates the vibrations and tissue irritations associated with the repetitive impact of the fingers. The present invention provides such a solution.

SUMMARY OF THE INVENTION

The present invention provides an improved keyboard for decreasing the risk of repetitive stress injuries. The no-impact keyboard of the invention incorporates a means for cushioning each keystroke to decrease or eliminate the vibrational impact traditionally absorbed into the body when the key reaches the hard bottom of the keystroke.

According to a preferred embodiment, the no-impact keyboard includes a plurality of keys, each of the keys comprising a key cap and a stem; an impact absorbing mechanism which prevents any part of a key from striking a hard surface during a keystroke by a typist's finger; and means for sending an actuation signal from each key when the key passes a defined point in the keystroke.

In another aspect, the present invention is an impact absorbing keyboard comprising a plurality of keys, each of the keys having a cap and a stem with a bottom end; a circuit board mounted under the plurality of keys; means for each key to make electrical contact with the circuit board; and an impact absorbing spring having a spring tension sufficient to prevent the bottom end of the stem from striking the circuit board when the key cap is struck.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
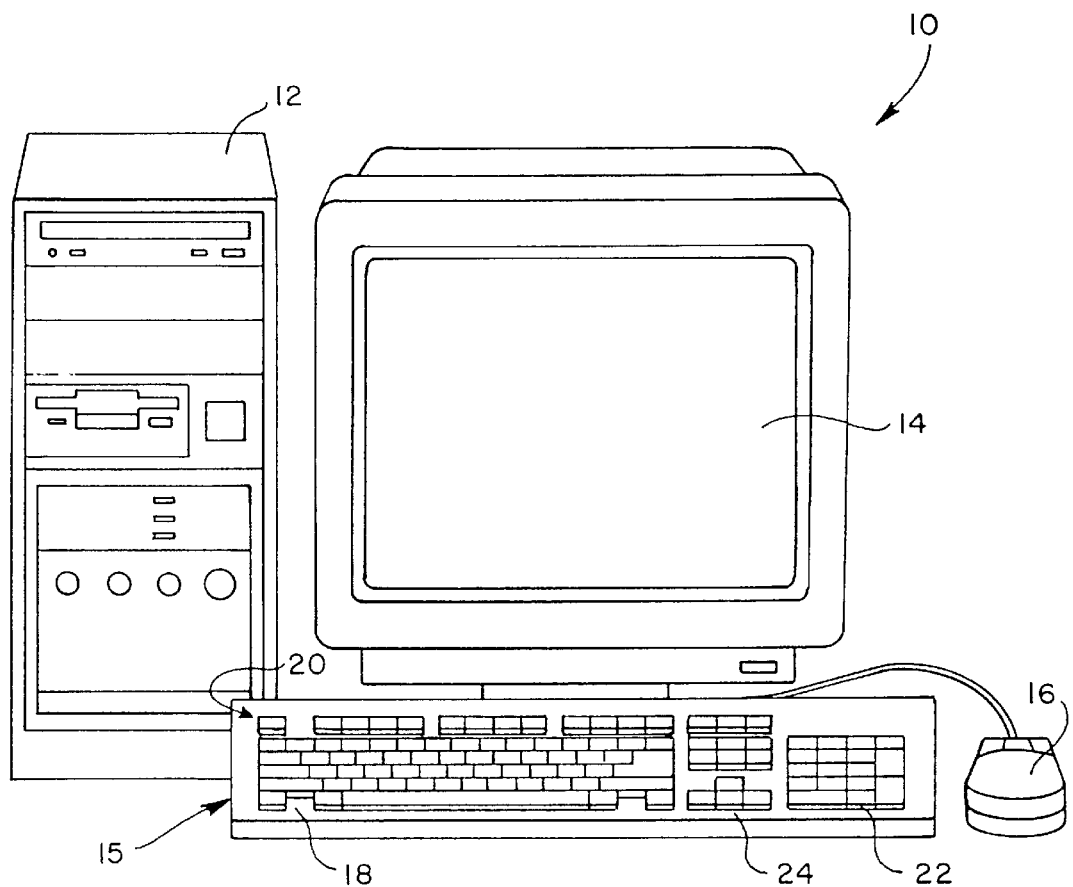
FIG. 1 is a diagram of a computer system including a computer display device and a keyboard incorporating an embodiment of the present invention.
Figure 2:
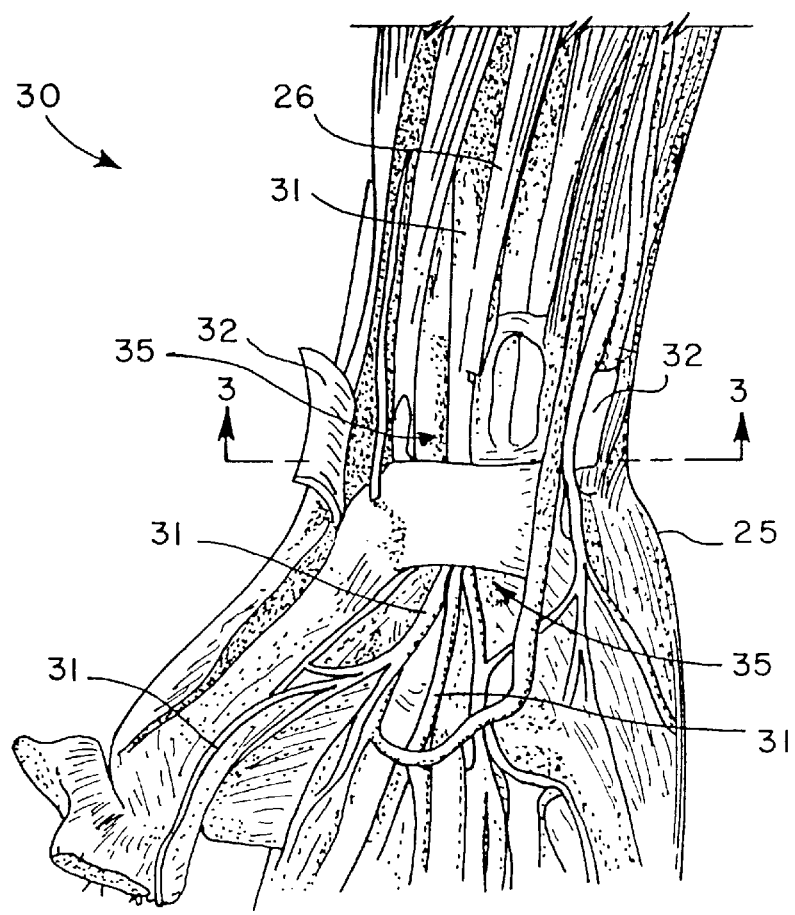
FIG. 2 is an illustrative drawing of the human wrist including bones, muscles, tendons, arteries, and nerves.
Figure 3:
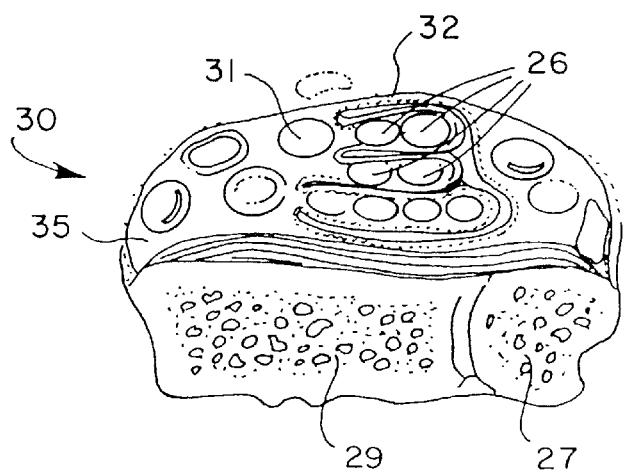
FIG. 3 is a cross-sectional view of the human wrist taken along line 3—3 of FIG. 2.
Figure 4:
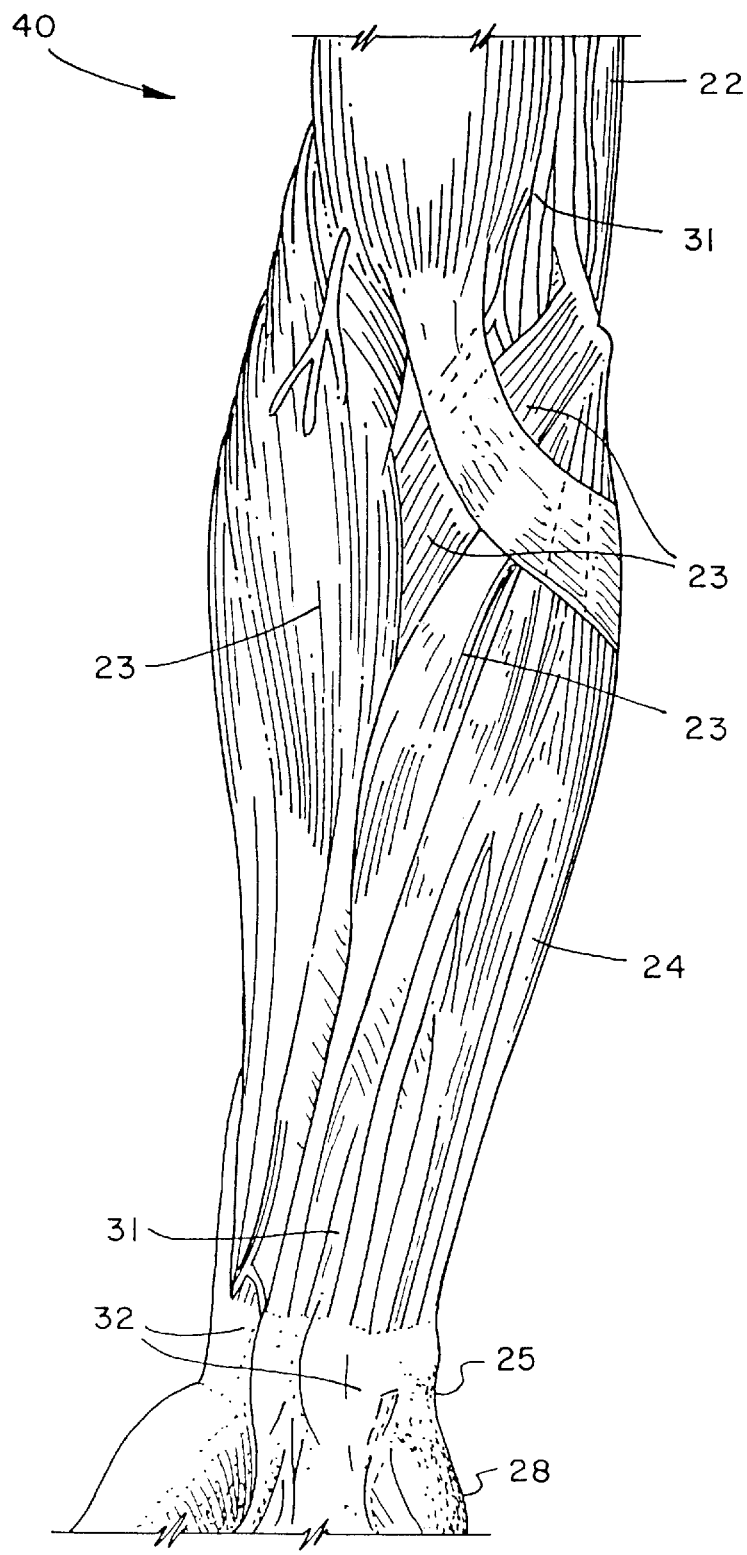
FIG. 4 is an illustrative drawing of the human arm depicting the path of the median nerve through the muscle tissue and palmar carpal ligament.
Figure 5A:
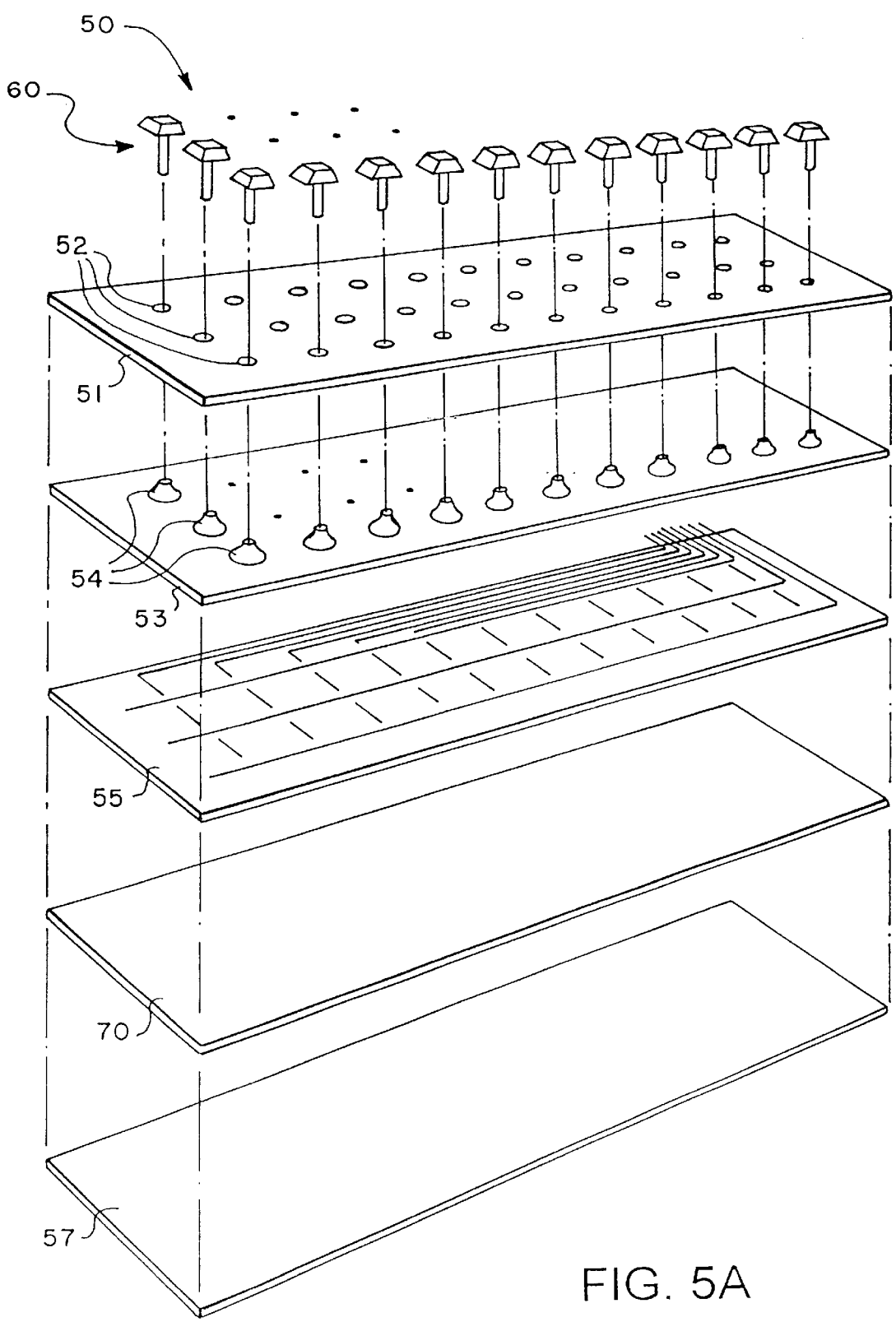
FIG. 5A is an exploded perspective view of a computer keyboard having a flexible circuit board, incorporating an embodiment of the present invention.
Figure 5B:
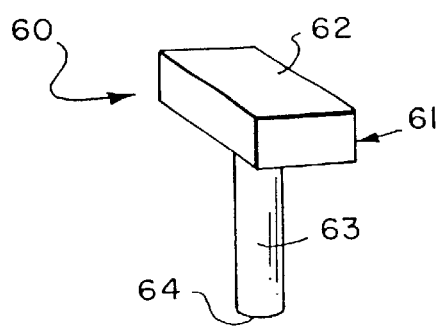
FIG. 5B is an example key style for use in keyboards incorporating an embodiment of the present invention.
Figure 5C:
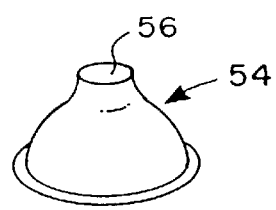
FIG. 5C is an example spring cup for use individually or on spring templates of keyboards incorporating an embodiment of the present invention.

Referring to FIGS. 5A, a preferred embodiment of the apparatus of the invention is shown and described. No-impact keyboard 50 comprises a plurality of alphanumeric function and command keys 60, a strike plate 51 having a plurality of apertures therein, spring template 53 having a plurality of spring cups 54 mounted thereon in vertical alignment with the apertures 52, flexible circuit board 55, circuit board support plate 57, and an impact absorbing mechanism 70 mounted between the flexible circuit board 55 and the circuit board support plate 57. Referring to FIG. 5B, each key 60 has a cap 61, an upper typing surface 62, a stem 63, and a bottom 64. FIG. 5C illustrates a spring cup 54 which may be a flexible rubber or plastic cup having a conductive contact disk 56 mounted inside in the apex thereof. When the keyboard 50 is assembled, the stems 63 of each key 60 pass through the apertures 52 of strike plate 51 and rest above the top of each spring cup 54.

With continuing reference to FIGS. 5A–5C, the motion of the keys 60 during a keystroke will be described. During a downward keystroke, the user strikes the upper surface 62 of the key 60, depressing the cap 61 and causing the bottom 64 of stem 63 to contact the top of the spring cup 54 directly below the key. As the downward motion continues, the stem 63 deforms spring cup 54, causing the contact disk 56 to contact the flexible circuit board 55, creating an electrical contact with the circuit board 55, and sending a signal to the central processing unit (not shown) within computer 12. When contact is made, the motion and pressure of the stem 63 flexes the circuit board 55 into the impact absorbing mechanism 70 which may be a sheet of impact absorbing material as described below. The shock of the impact, and any vibrations created thereby, are absorbed into the impact absorbing sheet 70 and not returned to the user's fingers and upper limbs. The impact absorbing sheet 70 is made thick enough that the bottom edge of the key cap 61 does not strike the top of the strike plate 51 when the key 60 is fully depressed.

Flexible circuit board 55, and impact absorbing sheet 70 return to their original shape when the user releases the key 60, and spring cup 54 returns the key 60 to its raised position. The tension of spring cup 54, the distance of the downward keystroke, and the resiliency of the absorption mechanism 70, as more fully described below, control the touch response time of the upward key return.

Inclusion of the impact absorption mechanism 70 in keyboard 50, prevents the downward keystroke from creating a repetitive shock to the user's upper limbs. Without the absorption mechanism 70, the flexible circuit board 55 would be mounted directly on the rigid support plate 57, causing the repetitive cycle of injurious impacts and jarring of the bones and tissues of the user's upper limbs.

Figure 6:
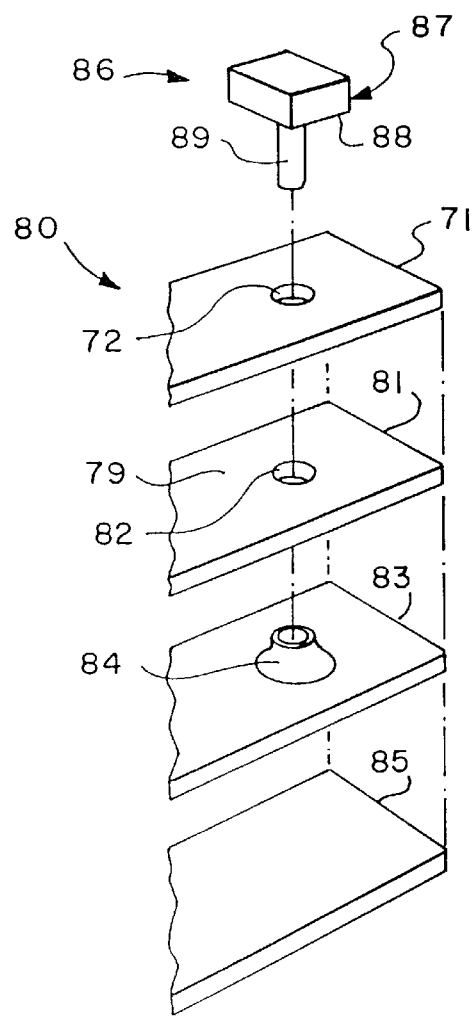
FIG. 6 is a partial exploded perspective view of a computer keyboard having a key cap strike plate, incorporating another embodiment of the present invention.

In another embodiment of the invention as shown in FIG. 6, the impact absorbing mechanism of keyboard 80 is an impact sheet 71 having a plurality of apertures 72. Impact sheet 71 is mounted on the upper surface 79 of key cap strike plate 81 above spring template 83 and circuit board 85. As shown, key 86 has a key cap 87, a rim 88 and a stem 89. Stem 89 passes through apertures 72 and 82 of mechanism 71 and plate 81 and rests above the top of spring cup 84. During a downward keystroke, rim 88 of cap 87 strikes and deforms absorption mechanism 71 as stem 89 pushes the contact disk of the spring cup 84 onto the circuit board 85. In this embodiment of the invention, the no-impact keyboard can be designed using several different circuit board styles, including a traditional, non-flexible printed circuit board as well as the flexible style shown in FIG. 5A. The impact sheet 71 must be thick enough so that some deformation is achieved by the impact of the rim 88 prior to the stem 89 pushing the contact disk of the spring cup 84 onto the circuit board 85. Otherwise, the impact is absorbed by the circuit board 85 instead of the impact sheet 71.

Figure 7:
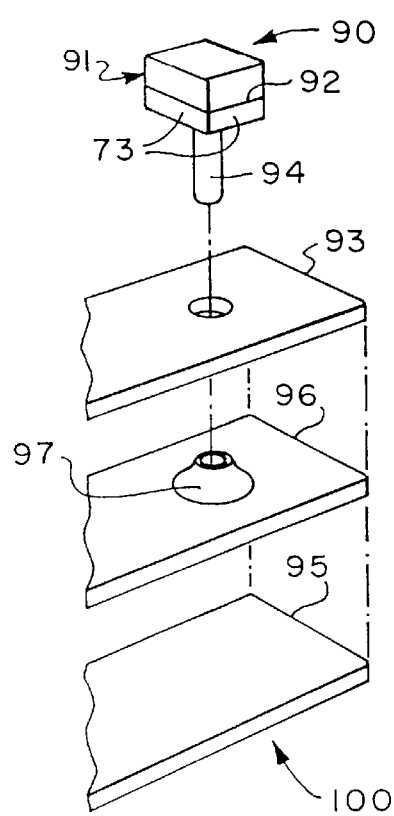
FIG. 7 is a partial exploded perspective view of a computer keyboard having a stem style key incorporating an embodiment of the present invention.

Referring to FIG. 7, another embodiment of the present invention is shown in which the impact absorbing mechanism is an impact ring 73. Key 90 includes a cap 91 having a rim 92 and a stem 94. Mounted on rim 92, impact ring 73 contacts the key cap strike plate 93 of keyboard 100, compresses during the downward keystroke, and returns to its original state on the upward key movement after stem 94 pushes the contact disk of spring cup 97, mounted on spring template 96, onto the circuit board 95 to create an electrical contact. In this manner, the impact is absorbed by the impact ring 73.

Figure 8:
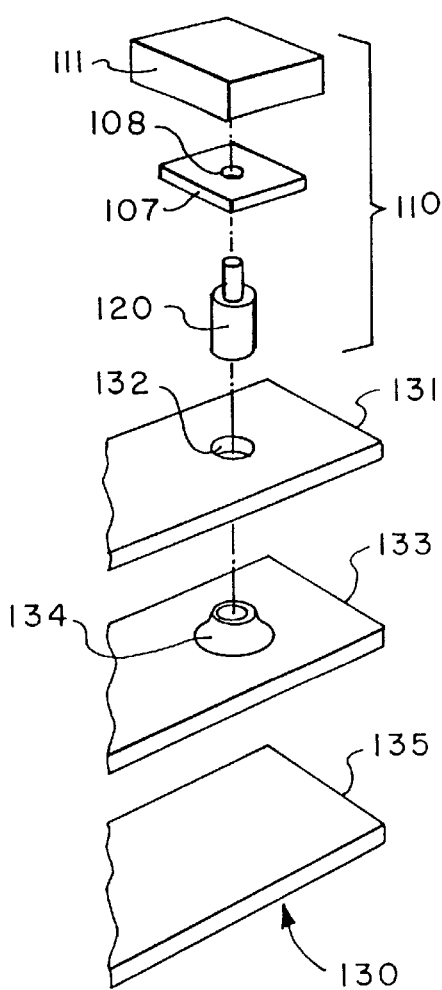
FIG. 8 is a partial exploded perspective view of a computer keyboard having a two-part key, incorporating an embodiment of the present inventions.
Figure 9A:
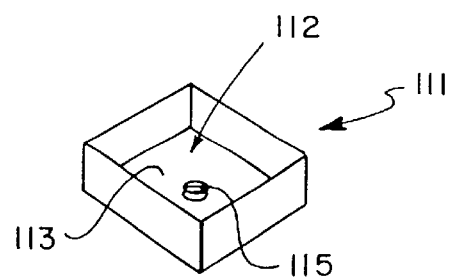
FIG. 9A is a bottom perspective view of the cap of FIG. 8.
Figure 9B:
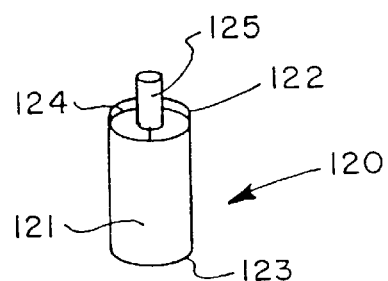
FIG. 9B is a perspective view of the stem of FIG. 8.

With reference to keyboard 130 of FIGS. 8 and 9, another embodiment of the present invention is shown wherein the impact absorbing mechanism is an individual key impact sheet 107 having an aperture 108. Key 110 includes a cap 111 and a stem 120. FIG. 9A is a bottom perspective view of the cap 111 showing an interior 112 with an upper interior surface 113 and a stem attachment slot 115. FIG. 9B is a perspective view of the stem 120 showing a body section 121 having a top end 122, a bottom end 123, and an interior 124 including a cap attachment tab 125 which fits into slot 115. Impact sheet 107 is mounted within interior 112 of key 110 on the upper interior surface 113. Aperture 108 permits assembly of the key using conventional attachment means 115 and a slightly longer tab 125 without disturbing the functionality of absorption mechanism 107.

Referring again to FIG. 8, the stem 120 is long enough to prevent the key cap 111 from striking strike plate 131. Instead, the bottom 123 of stem 120 pushes the contact disk of the spring cup 134, mounted on spring template 133, onto the circuit board 135 before the key cap 111 reaches the strike plate 131. The impact absorbing sheet 107 absorbs the impact as it is deformed between the top 122 of the stem 120 and the upper interior surface 113 of the key cap 111. When the key 110 is released, the impact absorbing sheet 107 returns to its original shape as the key is returned to its raised position by spring cup 134.

The impact absorbing mechanism described above, including 70, 72, 73, and 107 may be made from several resilient or elastomeric substances. Materials and blends of materials suitable for construction of the impact absorbing mechanisms of the present invention include resilient polymers and blends such as polyethylene, a crosslinked polyethylene, polyurethane-polyether, polyurethane-polyester, and nitrile rubbers. One preferred material is Ensolite®, a blend of nitrile rubber and poly vinyl chloride (PVC) plastics available with densities in the range of 3.8–8.5 PCFs (pounds per cubic foot).

It will be understood and appreciated by those skilled in the art that the actual blend and density of the material chosen to construct the impact absorption mechanism will be dependant upon the designer's preferred key movement, touch response, spring tension, and location of the impact absorbing mechanism.

Referring again to FIG. 5A, it will also be understood and appreciated by those skilled in the art that the impact absorbing mechanism may be placed anywhere in the chain of components between the user's finger and the hard impact surface upon which keys currently strike. Thus, in addition to the exemplary embodiments described herein, an impact absorbing material could also be placed on the top surfaces of the keys 60, or on the top of the spring cups 54, and still remain within the scope of the present invention. Additionally, the soft rubber spring cups 54, which currently function only to bring the keys back to their raised position, may be replaced by stiffer springs which perform the additional function of absorbing much of the impact of the keys.

Figure 10:
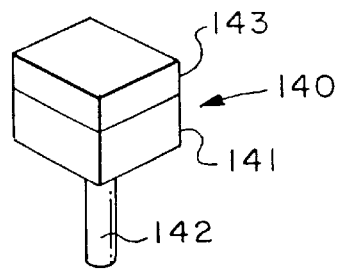
FIG. 10 is an example key style which incorporates another embodiment of the present invention.

FIG. 10 is an example key style which incorporates another embodiment of the present invention. A key 140 includes a key cap 141 and a key stem 142. Mounted on the top of the key cap 141 is a sheet of impact absorbing material 143. With this embodiment, the interior design of the keyboard is essentially unchanged, since the impact is absorbed on the top of the keys.

Figure 11:
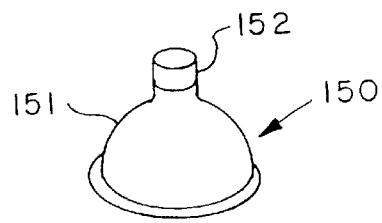
FIG. 11 is an example spring cup which incorporates another embodiment resent invention.

FIG. 11 is an example spring cup 150 which incorporates another embodiment of the present invention. The body 151 of the spring cup is a flexible rubber or plastic cup having a conductive contact disk (not shown) mounted inside in the apex thereof. Mounted on the top of the spring cup 150 is a disk of impact absorbing material 152. During a downward keystroke, the user strikes the upper surface of the key, depressing the key cap and causing the bottom of the key stem to contact the top of the impact absorbing disk 152 directly below the key. As the downward motion continues, the stem deforms spring cup 150, causing the contact disk to contact the circuit board. When contact is made, the motion and pressure of the stem compresses the impact absorbing disk 152 on the top of the spring cup 150. The shock of the impact, and any vibrations created thereby, are absorbed into the impact absorbing disk 152 and not returned to the user's fingers and upper limbs.

Figure 12:
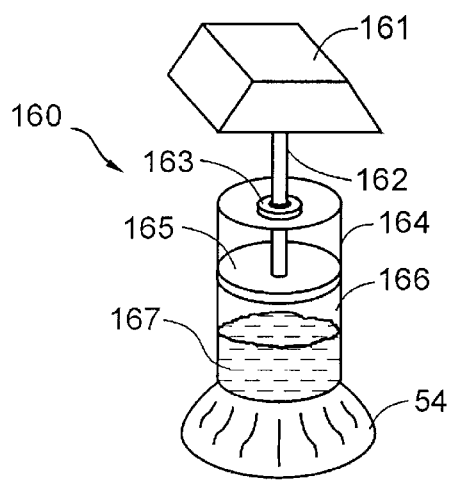
FIG. 12 is a perspective view of a key piston and cylinder utilized in a hydraulic-pneumatic embodiment of the present invention.

FIG. 12 is a perspective view of a piston and cylinder mechanism 160 utilized in a hydraulic-pneumatic embodiment of the present invention. A key cap 161 is attached to a stem 162 which passes through an airtight and watertight seal 163 into a cylinder 164. A piston 165 is mounted on the bottom end of the stem. The cylinder, in turn, is mounted on top of a spring cup 54 as described with reference to FIG. 5C. Within the cylinder, there is located an air gap 166 and a fluid 167.

When the key cap 161 is struck by the force of a typist's finger, the stem 162 and piston 165 are depressed into the cylinder 164. The air within the air gap 166 is compressed by the piston until the point that the finger force causes the spring cup 54 to deform, making electrical contact with the keyboard underneath. At this point, the air in the cylinder continues to compress, thereby absorbing the impact from the typist's finger. When the finger force is released, the spring cup and the compressed air cause the key cap to return to its raised position. Alternatively, the cylinder may be mounted on a pressure sensor which activates at a predetermined pressure threshold and sends an electrical signal indicating that the key has been struck. In either embodiment, the level of the fluid 167 determines the length of the keystroke.

Figure 13:
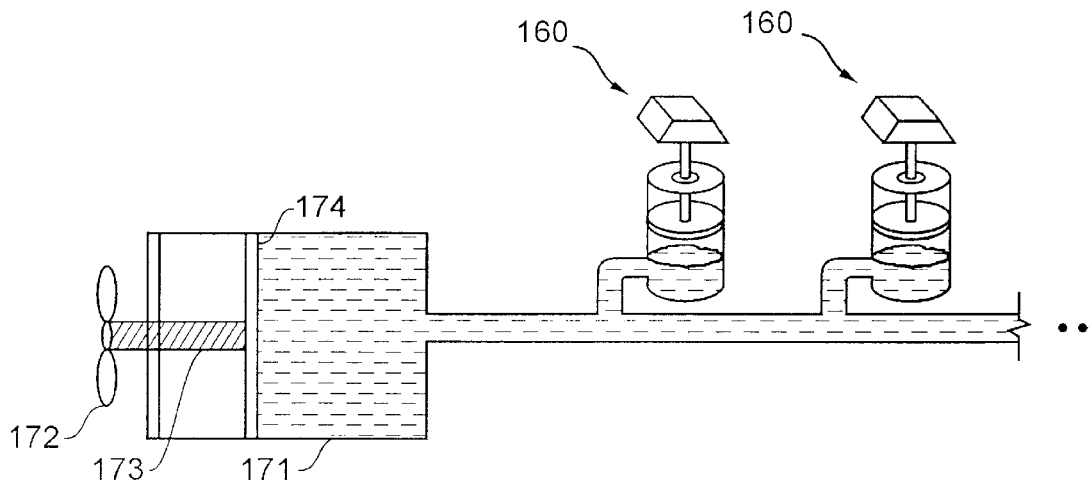
FIG. 13 is a simplified block diagram of an adjustment mechanism for adjusting the keystroke length in the hydraulic-pneumatic embodiment of FIG. 12.

FIG. 13 is a simplified block diagram of an adjustment mechanism for adjusting the keystroke length in the hydraulic-pneumatic embodiment of FIG. 12. Since the level of the fluid 167 determines the length of the keystroke, the keystroke is adjusted by adjusting the fluid level. For example, a fluid reservoir 171 may be implemented in the keyboard. The reservoir is connected to each of the piston and cylinder mechanisms 160. By turning a knob 172 on the side of the keyboard, a screw 173 moves a reservoir piston 174 through the reservoir causing fluid to flow into the piston and cylinder mechanisms. By reversing the direction of the knob, fluid is withdrawn from the piston and cylinder mechanisms. In other embodiments, electrical controls or other mechanisms may be utilized to control the fluid level in the piston and cylinder mechanisms, and thereby control the length of the keystroke.

Figure 14:
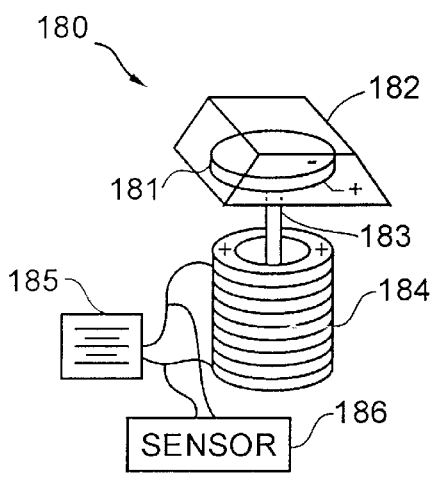
FIG. 14 is a perspective view of a magnetic impact-absorbing mechanism in another embodiment of the present invention.

FIG. 14 is a perspective view of a magnetic impact-absorbing mechanism 180 in another embodiment of the present invention. A magnetic device such as a permanent magnet 181 is mounted within a key cap 182. The magnet is mounted with a polarity such as its north (+) pole on the bottom side of the magnet, and its south (−) pole on the top side of the magnet. The key stem 183 passes through a second magnetic device such as an electromagnet 184. An electrical power supply 185 places a voltage potential across the electromagnet causing a current to flow and creating a magnetic field. The magnetic field polarity is such that its north (+) pole is up and its south pole (−) is down. Therefore, a repulsive force is created between the key cap magnet 181 and the electromagnet 184.

When the key cap 182 is struck by the force of a typist's finger, the stem 183 is depressed into the electromagnet 184. As the two north poles approach each other, the repulsive force between the magnets increases, absorbing the impact of the typist's finger. The magnetic field intensity also increases, creating a voltage change which can be sensed by sensor 186 in the circuit between the power source 185 and the electromagnet 184. When the voltage change exceeds a predetermined level, the sensor sends a signal indicating that the key has been struck. The stiffness of the magnetic impact-absorbing mechanism 180 may be controlled by changing the voltage level of the power source 185.

Figure 15:
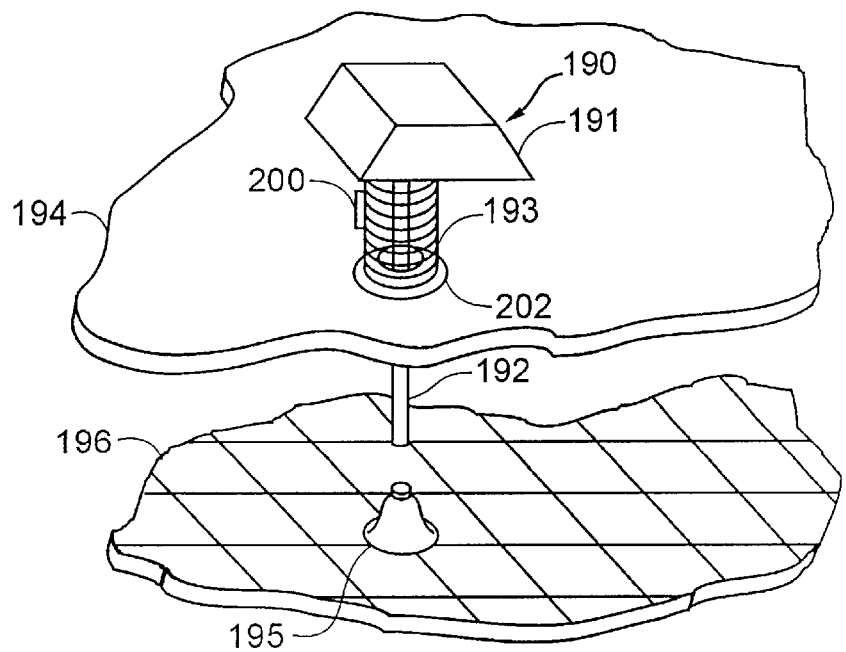
FIG. 15 is a perspective view of an alternative embodiment of the impact absorbing mechanism in the keyboard of the present invention.

FIG. 15 is a perspective view of an alternative embodiment of the impact absorbing mechanism in the keyboard of the present invention. A key 190 comprises a key cap 191 and a stem 192. The stem extends vertically through an impact absorbing spring 193 and through an aperture in a strike plate 194. The bottom end of the stem strikes and deforms a spring cup 195 mounted on a circuit board 196 when the key is struck by a typist's finger. The impact absorbing spring 193 compresses between the key cap 191 and the strike plate 194, thereby absorbing the impact of the typist's finger.

Figure 16A:
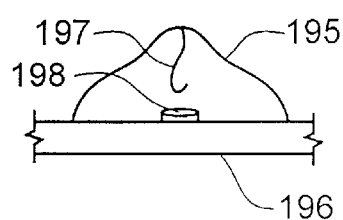
FIGS. 16A–16B are cross-sectional views of alternative embodiments of the spring cup utilized in the embodiment of FIG. 15.
Figure 16B:
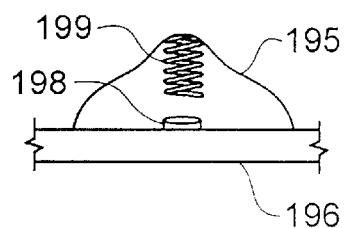

FIGS. 16A–16B are cross-sectional views of alternative embodiments of the spring cup 195 utilized in the embodiment of FIG. 15. In a first embodiment illustrated in FIG. 16A, a wire or wire loop 197 descends from the inside surface of the apex of the spring cup. When the key stem 192 compresses the spring cup, the wire 197 contacts a contact disk 198 mounted on the circuit board, and actuation of the key is completed. It should be noted that actuation of the key occurs at a height that is well above the point where the key stem 192 would bottom out and strike the hard surface of the circuit board. In FIG. 16B, the wire is replaced by a small conductive spring 199. When the key stem 192 compresses the spring cup, the conductive spring 199 contacts the contact disk 198 mounted on the circuit board, and actuation of the key is completed.

The distance between the strike plate 194 and the circuit board 196 is designed so that the key stem 192 cannot strike the circuit board. In addition, the spring tension of the impact absorbing spring 193 is such that the spring will not fully deform under all normal typing pressures. In normal operation, the key never bottoms out against a hard surface, and actuation of the key occurs through electrical contact with the contact disk at a point during the keystroke. Thus, all impact is eliminated, and the key is still reliably actuated. The keystroke length can be varied by varying the distance between the strike plate and the circuit board. In addition, the actuation point for the key can be varied by varying the height of the spring cup 195 and/or varying the length of the wire 197 or conductive spring 199.

Other configurations may also be implemented to achieve the functionality of the present invention. In any suitable configuration, the key never bottoms out against a hard surface, and actuation of the key occurs through electrical contact a point during the keystroke. Thus all impact is eliminated, and the key is still reliably actuated. For example, a compression gauge 200 can be mounted on the impact absorbing spring 193 of FIG. 15, the compression gauge 200 sending a signal from the key when a predefined level of compression is reached during a keystroke. Alternatively, a pressure sensor 202 can be mounted under the spring 193, the pressure sensor 202 sending a signal from the key when a predefined level of pressure is reached during a keystroke. In either configuration, the spring cup 195 is eliminated, and the signal from the key is sent to the circuit board 196 or directly to the computer or other electronic device being controlled by the keyboard.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A no-impact keyboard comprising:

a plurality of keys, each of the keys comprising a key cap having a bottom surface, and a stem;

a key cap strike plate mounted under the key cap of each key, the strike plate having a hard top surface and a plurality of apertures therethrough, the stem of each key passing vertically through an aperture in the strike plate;

an impact eliminating mechanism which prevents any part of a key from striking a hard surface during a keystroke by a typist's finger, said mechanism comprising an impact eliminating spring mounted between the hard top surface of the strike plate and the bottom surface of the key cap, the impact eliminating spring having a spring tension sufficient to prevent the bottom surface of the key cap from striking the hard top surface of the strike plate; and means for sending an actuation signal from each key when the key passes a defined point in the keystroke, said means for sending an actuation signal including a compression gauge mounted on the impact eliminating spring, the compression gauge reporting actuation of the key when the gauge senses a degree of compression of the impact eliminating spring which is greater than a predefined level.

2. A no-impact keyboard comprising:

a plurality of keys, each of the keys comprising a key cap having a bottom surface, and a stem;

a key cap strike plate mounted under the key cap of each key, the strike plate having a hard top surface and a plurality of apertures therethrough, the stem of each key passing vertically through an aperture in the strike plate;

an impact eliminating mechanism which prevents any part of a key from striking a hard surface during a keystroke by a typist's finger, said mechanism comprising an impact eliminating spring mounted between the hard top surface of the strike plate and the bottom surface of the key cap, the impact eliminating spring having a spring tension sufficient to prevent the bottom surface of the key cap from striking the hard top surface of the strike plate; and means for sending an actuation signal from each key when the key passes a defined point in the keystroke, said means for sending an actuation signal including a pressure sensor mounted on the top surface of the strike plate under the impact eliminating spring, the pressure sensor reporting actuation of the key when the gauge senses a pressure from the impact eliminating spring which is greater than a predefined level.

3. A no-impact keyboard comprising:

a plurality of keys, each of the keys comprising a key cap having a bottom surface, and a stem;

a circuit board mounted under the plurality of keys, said circuit board including a plurality of contact disks mounted thereon, each disk being mounted under the stem of a key;

an impact eliminating mechanism which prevents any part of a key from striking a hard surface during a keystroke by a typist's finger; and means for sending an actuation signal from each key when the key passes a defined point in the keystroke, said means for sending an actuation signal including a spring cup mounted on the circuit board in a position that covers one of the contact disks, the spring cup having an apex and a conductive wire descending from an inside surface of the apex, the apex having sufficient height above the contact disk to prevent the conductive wire from striking the disk when the spring cup is in a raised position, and to allow the wire to contact the disk when the spring cup is in a depressed position, whereby depression of the key causes the key stem to depress the spring cup, thereby causing the conductive wire to contact the contact disk and to send an actuation signal from the key without the stem striking the contact disk.

4. A no-impact keyboard comprising:

a plurality of keys, each of the keys comprising a key cap having a bottom surface, and a stem;

a circuit board mounted under the plurality of keys, said circuit board including a plurality of contact disks mounted thereon, each disk being mounted under the stem of a key;

an impact eliminating mechanism which prevents any part of a key from striking a hard surface during a keystroke by a typist's finger; and means for sending an actuation signal from each key when the key passes a defined point in the keystroke, said means for sending an actuation signal including a spring cup mounted on the circuit board in a position that covers one of the contact disks, the spring cup having an apex and a conductive spring descending from an inside surface of the apex, the apex having sufficient height above the contact disk to prevent the conductive spring from striking the disk when the spring cup is in a raised position, and to allow the spring to contact the disk when the spring cup is in a depressed position, whereby depression of the key causes the key stem to depress the spring cup, thereby causing the conductive spring to contact the contact disk and to send an actuation signal from the key without the stem striking the contact disk.

* * * * *